(12) United States Patent
Godavarthi et al.

(10) Patent No.: US 12,386,382 B2
(45) Date of Patent: Aug. 12, 2025

(54) REDUCED TRAINING FOR MAIN BAND CHIP MODULE INTERCONNECTION CLOCK LINES

(71) Applicant: QUALCOMM Incorporated, San Diego, CA (US)

(72) Inventors: Lekhya Pavani Godavarthi, Hyderabad (IN); Ravindranath Doddi, Hyderabad (IN); Harinatha Reddy Ramireddy, Hyderabad (IN); Afreen Haider, Muzaffarpur (IN); Umamaheshwaran V, Salem (IN)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 18/329,462

(22) Filed: Jun. 5, 2023

(65) Prior Publication Data
US 2024/0402751 A1  Dec. 5, 2024

(51) Int. Cl.
*G06F 1/08* (2006.01)

(52) U.S. Cl.
CPC ...................... *G06F 1/08* (2013.01)

(58) Field of Classification Search
CPC ......................................................... G06F 1/08
See application file for complete search history.

(56) References Cited

U.S. PATENT DOCUMENTS

| 5,946,303 | A | * | 8/1999 | Watson | H04Q 9/00 |
| | | | | | 370/254 |
| 7,607,031 | B2 | * | 10/2009 | Mackey | G06F 1/3253 |
| | | | | | 713/323 |
| 8,964,548 | B1 | * | 2/2015 | Keralapura | H04L 43/026 |
| | | | | | 370/235 |
| 9,075,602 | B2 | * | 7/2015 | Hsu | G06F 1/32 |
| 11,054,891 | B2 | * | 7/2021 | Popovich | H04L 41/0833 |
| 11,095,556 | B2 | * | 8/2021 | Das Sharma | H04L 49/60 |
| 2007/0232254 | A1 | * | 10/2007 | Mackey | G06F 1/3287 |
| | | | | | 455/343.1 |

(Continued)

OTHER PUBLICATIONS

"Universal Chiplet Interconnect Express (UCIe)", Specification Revision 1.0, Feb. 24, 2022, 7 Pages, Sections (4.5.3.3.3, 4.5.3.3.4 and 4.5.3.3.5).

(Continued)

*Primary Examiner* — Aurel Prifti
(74) *Attorney, Agent, or Firm* — Loza & Loza, LLP/Qualcomm

(57) ABSTRACT

Aspects relate to reduced training for main band chip module interconnection clock lines. In one example a method includes sending iterations of a first training pattern from a module of a first die to a module partner of a second die on a first main band clock line of a die-to-die connection, the die-to-die connection including a sideband, a main band comprising the first main band clock line, and at least one data line supported by at least the first main band clock line. An automatic result is received from the module partner through the sideband prior to completion of the iterations of the first training pattern, the automatic result indicating successfully receiving the training pattern. Data is communicated with the module partner through the main band using at least the first main band clock line in response to receiving the automatic result.

23 Claims, 8 Drawing Sheets

(56) References Cited

U.S. PATENT DOCUMENTS

| | | | | |
|---|---|---|---|---|
| 2007/0234080 | A1* | 10/2007 | Mackey | G06F 1/3203 |
| | | | | 713/300 |
| 2013/0054884 | A1* | 2/2013 | Gupta | G06F 13/387 |
| | | | | 711/E12.078 |
| 2014/0003451 | A1* | 1/2014 | Wagh | G06N 20/00 |
| | | | | 370/468 |
| 2017/0235701 | A1* | 8/2017 | Pethe | G06F 13/4286 |
| | | | | 710/313 |
| 2020/0092075 | A1* | 3/2020 | Ahn | H04L 25/14 |
| 2020/0226084 | A1* | 7/2020 | Das Sharma | G06F 13/362 |
| 2020/0394150 | A1* | 12/2020 | Lanka | G06F 13/4286 |
| 2022/0327083 | A1* | 10/2022 | Das Sharma | H01L 25/18 |
| 2022/0342840 | A1* | 10/2022 | Das Sharma | G06F 13/4221 |
| 2022/0342841 | A1* | 10/2022 | Choudhary | G06F 13/4221 |
| 2022/0350769 | A1* | 11/2022 | Hor | G06F 13/1652 |
| 2023/0096585 | A1 | 3/2023 | Ke et al. | |
| 2023/0195677 | A1* | 6/2023 | Li | G06F 13/4068 |
| | | | | 710/313 |
| 2024/0080123 | A1* | 3/2024 | Lee | H04B 10/40 |
| 2024/0345976 | A1* | 10/2024 | Doddi | G06F 13/4273 |
| 2024/0354279 | A1* | 10/2024 | Doddi | G06F 13/4063 |
| 2025/0021504 | A1* | 1/2025 | Doddi | G06F 13/4018 |

OTHER PUBLICATIONS

International Search Report and Written Opinion—PCT/US2024/023800—ISA/EPO—Jun. 27, 2024.

* cited by examiner

REDUCED TRAINING FOR MAIN BAND CHIP MODULE INTERCONNECTION CLOCK LINES

TECHNICAL FIELD

Aspects of the present disclosure relate generally to data communication between integrated circuit chip modules and, in particular, to training for clock lines of a main band connection.

BACKGROUND

As integrated circuit (IC) chips grow smaller, it has become possible to package multiple chips into a single package. Each chip may be optimized for the cost, materials, fabrication process, and size that is best suited for a particular function. In such a package, a central processor may be fabricated separately from a graphics processor, a special purpose processor, a volatile memory, a non-volatile memory, an input/output controller, or other components. Different components may be packaged together to meet different needs without redesigning any of the individual components. By placing these disparate chips into a single package, the total system that includes the package may be made smaller. Similar principles apply to printed circuit board systems and subsystems. In addition, the connections between the disparate chips may be faster at less cost. In some cases, the smaller chips e.g., a memory, special purpose processor, or an interface are referred to as chiplets, however, any chip may be referred to as a chiplet.

The Universal Chiplet Interconnect express (UCIe) specification version 1.0 (UCIe 1.0) defines physical parameters and protocols for data transfer between a chip and a chiplet or between two chiplets. The connection may be direct or through a package. The interconnect may be within a single package or across a circuit board between two different packages. UCIe 1.0 is intended to support interoperability between chiplets of different manufacturers and designers. The UCIe 1.0 interconnect includes a MainBand which is the primary data transfer connection and a SideBand which is the primary initialization and control connection. A sequence of state transitions is defined to take the interconnect from SideBand Initialization to MainBand Initialization to Link Initialization to an Active state and back to standby and reset states.

A Standard Package version of UCIe 1.0 uses a MainBand with 16 data lanes, two clock lanes, a track lane, and a valid lane. The Standard Package version is directed to a larger bump pitch connector, e.g., 100-130 micrometers and longer distances, e.g., 10-25 mm that might be found connecting two packages on a circuit board. An Advanced Package version of UCIe 1.0 uses a MainBand with 64 data lanes, two clock lanes, a track lane, a valid lane, four redundant data lanes, a redundant clock lane, and a redundant valid lane. The Advanced Package version is directed to a smaller bump pitch connector, e.g., 25-55 micrometers and shorter distances, e.g., less than 2 mm that might be found within a package. New applications for each version and new versions may be developed over time.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example a method includes sending iterations of a first training pattern from a module of a first die to a module partner of a second die on a first main band clock line of a die-to-die connection that connects the module to the module partner, the die-to-die connection including a sideband, a main band comprising the first main band clock line, and at least one data line supported by at least the first main band clock line. An automatic result is received from the module partner through the sideband prior to completion of the iterations of the first training pattern, the automatic result indicating successfully receiving the training pattern, and data is communicated with the module partner through the main band using at least the first main band clock line in response to receiving the automatic result In another example a non-transitory computer-readable medium has instructions stored therein for causing a processor of an die-to-die connection to perform the operations of the method above.

In another example an apparatus includes a main band transmitter of a module of a first die configured to send iterations of a first training pattern from a module of a first die to a module partner of a second die on a first main band clock of a die-to-die connection that connects the module to the module partner, the die-to-die connection including a sideband, and a main band comprising the first main band clock line, and at least one data line supported by at least the first main band clock line. A sideband receiver of the module is configured to receive an automatic result from the module partner through the sideband prior to completion of the iterations of the first training pattern, the automatic result indicating successfully receiving the training pattern.

The main band transmitter is further configured to communicate data with the module partner through the main band using at least the first main band clock line in response to receiving the automatic result To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

Figure 1:
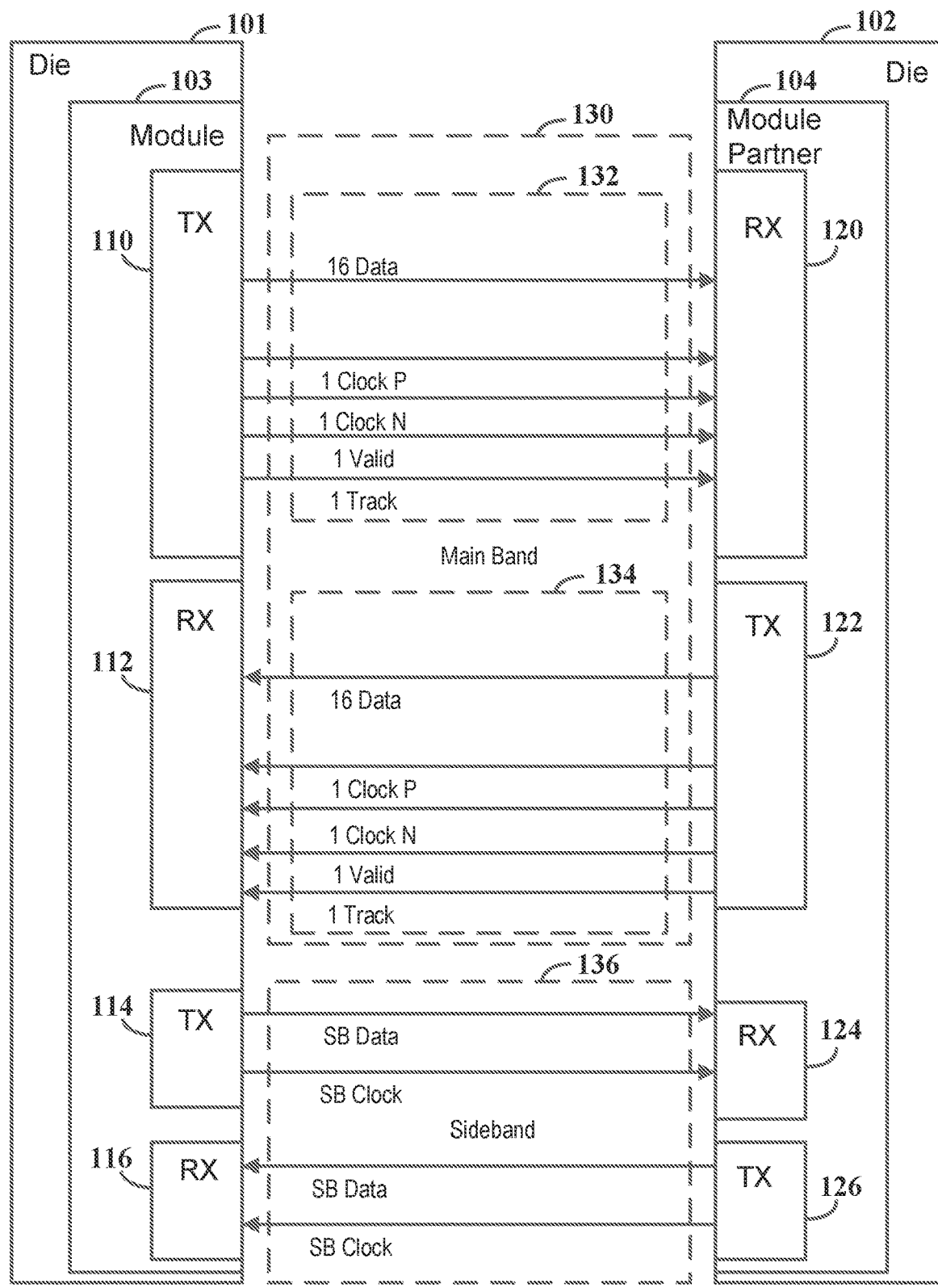
FIG. 1 is a block diagram of a module and a module partner coupled together with a 16 data lane die-to-die connection suitable for aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

A die-to-die connection herein can refer to a connection between any two dies, including a chip or a chiplet. A die may be considered to be any integrated circuit that is formed on and then cut, removed, or otherwise extracted from a wafer. The wafer may be silicon, glass, gallium nitride, or any other suitable material for forming integrated circuits. For the die-to-die connection, each die includes a module. In UCIe 1.0, a module on a die connects the data and clock lanes to the die circuitry. A lane has a transmit line and a receive line for a two-way connection. The module includes a die-to-die adapter processor, PHY (physical) logic, and the PHY interface. The PHY interface includes the transmitters and receivers for each line. A die may have multiple modules that may be coupled to modules of different dies or to the same die. While examples are presented in the context of UCIe 1.0, this interface specification is not required. The die-to-die connections described herein may also be used to connect two packages across a printed circuit board A die-to-die connection can offer a bidirectional main band connection with a high data rate by using multiple data lanes and multiple clock lanes. As used herein, each lane consists of a transmit line and a receive line. The lines are reciprocal in that a transmit line from the perspective of one module is a receive line from the perspective of the other module and vice versa. Stated another way one line is coupled to a transmitter of a module at one end and a receiver of a module at the other end.

To begin operation the main band of a die-to-die connection is initialized. A training pattern is sent on each line, the data lines and the clock lines, and the corresponding receiver trains on the training pattern and tests the pattern to ensure that the respective line is operational. The clock lines are trained independently of each other to test for shorts and breaks that affect other lines. Transmit lines are tested independently of receive lines for the same reason. A longer training pattern provides more time for the receiver to train and allows for a more accurate test. A shorter training pattern allows the die-to-die connection to be initialized more quickly. As the number of data and clock lines increases, the time to initialize the die-to-die connection also increases.

As described herein, multiple iterations of a clock training pattern may be used to ensure accurate training and testing. However, some of the training may be reduced in length, or truncated, by automatically sending a training result before the end of a training pattern and before a request for a training report is received. Automatic result sharing allows the receiving module to share the results of receiving a training pattern automatically upon successfully detecting iterations of a training pattern. This allows the clock line training to be completed more quickly, when possible. On the other hand, the full training may be used when necessary. The described approach may be applied to a UCIe Main-Band interconnect or to other main band interconnects between IC chip modules that have multiple clock lines. In the present description, parameters, configuration registers, signaling, and other features may be adapted to suit automatic result sharing.

FIG. 1 is a block diagram of a first die 101 and a second die 102 coupled together with a 16 data lane die-to-die connection 100, e.g., a UCIe Standard package interconnect, according to some aspects. Each die may have many other components (not shown) to generate, process, store, or communicate data or to supply or regulate power or perform operations, administration, or management functions, etc., depending on the nature of the die. The first die 101 has a module 103 and the second die 102 has a module partner 104. The module 103 and module partner 104 may have the same or a different structure and may include additional components (not shown) including transmitters, receivers, interfaces, adapters, logic, buffers, etc.

The connection has a main band 130 and a sideband 136. The main band has a transmit part 132 from the perspective of the module 103 and a receive part 134 from the perspective of the module 103. The 16 transmit data lanes each have a data line in the transmit part 132 and a data line in the receive part 134 for 16 lines in each direction. The sideband 136 also has a transmit part and a receive part each with a sideband data line and a sideband clock line.

The connection is symmetrical in that the module 103 has a main band transmitter 110 and the module partner 104 has a main band transmitter 122. These two transmitters perform the same functions and operations in opposite directions using the same protocols. Similarly, the module 103 has a main band receiver 112 and the module partner 104 has a main band receiver 120. The present description is directed to the module and its construction and operation but the description applies equally to the module partner 104 in just the same way. Either side may initiate repair or training and either side may initiate parameter, and configuration changes, etc. The module 103 has a sideband transmitter 114 and a sideband receiver 116. The module partner 104 also has a sideband receiver 124 and transmitter 126.

UCIe 1.0 has a layered protocol with a physical layer and a die-to-die adapter. The physical layer can consist of all types of current packaging options from different fabricators and fabrication processes. Examples include 2D packaging, 2.5D packaging, 3D packaging and other approaches e.g., silicon-bridge, embedded multi-die interconnect bridge (EMIB), interposer-based chip-on-wafer-on-substrate (CoWoS), and fan-out chip on substrate (FOCoS) interposer packages, and any other connection between two dies on the same substrate or two packages on the same substrate. Optical or electrical connections may be made between packages to other components. UCIe may be expanded in future revisions to connect dies or packages across rack-based components.

The UCIe 1.0 protocol layer runs on top of the physical layer, and has many features in common with Peripheral Component Interconnect express (PCIe), Compute eXpress Link (CXL) and other pre-existing protocols. The PCIe protocol provides wide interoperability and flexibility. The CXL protocol provides low latency and high throughput connections. UCIe 1.0 may be expanded in future revisions to include other protocols and further modifications away from PCIe and CXL. The structures and methods presented herein are described in the context of UCIe 1.0, but may be adapted to future versions of UCIe under any name and other connection configurations with multiple clock lanes.

In FIG. 1, the main band 130 has two clock lanes that operate at the same frequency with different phase. There is one clock P line and one clock N line in the main band transmit part 132 and one clock P line and one clock N line in the main band receive part 134. In UCIe 1.0, this is the MainBand connection. The two transmit lines of the clock lane are sometimes referred to as TCKP and TCKN and the two receive lines of the clock lane are sometimes referred to as RCKP and RCKN.

The valid lane may be considered as a type of clock signal and will be referred to herein as a clock lane having a transmit valid line and a receive valid line. In UCIe 1.0, the Valid signal (referred to as TVLD for transmit and as RVLD for receive) is sent on the valid line to frame the data sent on the data lines. The Valid signal marks the start and middle of a data packet on the data lines. For each 8-bit data packet with 8 unit intervals (UIs), the Valid signal is asserted for the first 4 UI and de-asserted for the second 4 UI. It is asserted again at the start of the next 8-bit packet. The Valid signal is used to gate the clock distribution to all data of the data lines to enable fast idle exit and entry. The Valid line also allows data transfer in a raw mode or in various Flit modes.

The track lane may be considered as another type of clock lane and will be referred to herein as a clock lane. In UCIe 1.0, the Track signal (referred to as TTRK_L for transmit and RTRK_L for receive) can be used to perform runtime recalibration to adjust the receiver clock path against slow varying voltage, temperature and transistor aging conditions. A broken clock lane, whether designated as clock, track, or valid, may also be remapped to redundant clock lane or to a track lane.

To train the 2 clock lines and the track line, a UCIe 1.0 Module sends 128 iterations of a clock repair pattern (referred to as CLKREPAIR). The clock repair pattern has 16 clock cycles followed by 8 cycles of low, on each clock line in each direction. The lines are tested one at a time and in sequence. To train the valid line, a UCIe 1.0 module sends 128 iterations of a valid training (VALTRAIN) pattern, which has four 1's followed by four 0's on the valid line in each direction along with the forwarded clock.

The receiving module, whether the module partner in one direction or the module in the other direction, detects each training pattern in each line in sequence. In UCIe 1.0, a successful detection is defined as at least 16 consecutive iterations of the respective pattern, CLKREPAIR or VALTRAIN, being detected. The receiving module logs the results as successful or not successful. After completing the training patterns, the sending module sends a request for a training report through the sideband (referred to as MBINIT.REPAIRVAL result req and MBINIT.REPAIRCLK result req). The receiving module sends the response, including the logged training pattern results, as a sideband response (referred to as MBINIT.REPAIRVAL result resp and MBINIT.REPAIRCLK result resp). The process is repeated for the other direction so that the module partner then sends iterations of each training pattern as the module detects the patterns.

As described herein, under some circumstances 16 consecutive iterations may be detected before the end of the 128 iterations. Under some circumstances 100 or more iterations may not be needed for successful detection. The number of iterations may then be cut short, or truncated, allowing the main band initialization to be performed more quickly. The receiving module, e.g., the module partner, may automatically send a training result prior to completion of the iterations of the training pattern. When this is before the end of iterations of the training pattern, then the iterations may be truncated. Iterations may be initiated on a second clock line before the iterations on the first clock line are completed and before a request for a training report has been sent. If a training result is shared for all clock lines before the request for the training report, then no training report request is needed.

This automatic training result may be referred to herein as an automatic result sharing (ARS) feature. The ARS feature allows the receiving module to automatically share the results of receiving a training pattern. The results are shared automatically in that the results are shared before receiving a request for the result. Instead, the receiving module, e.g., the module partner, shares the result of a training pattern reception upon successfully detecting the pattern, e.g., after 16 consecutive successful iterations. The training result may be sent on a sideband that does not interfere with the training of the main band.

Figure 2:
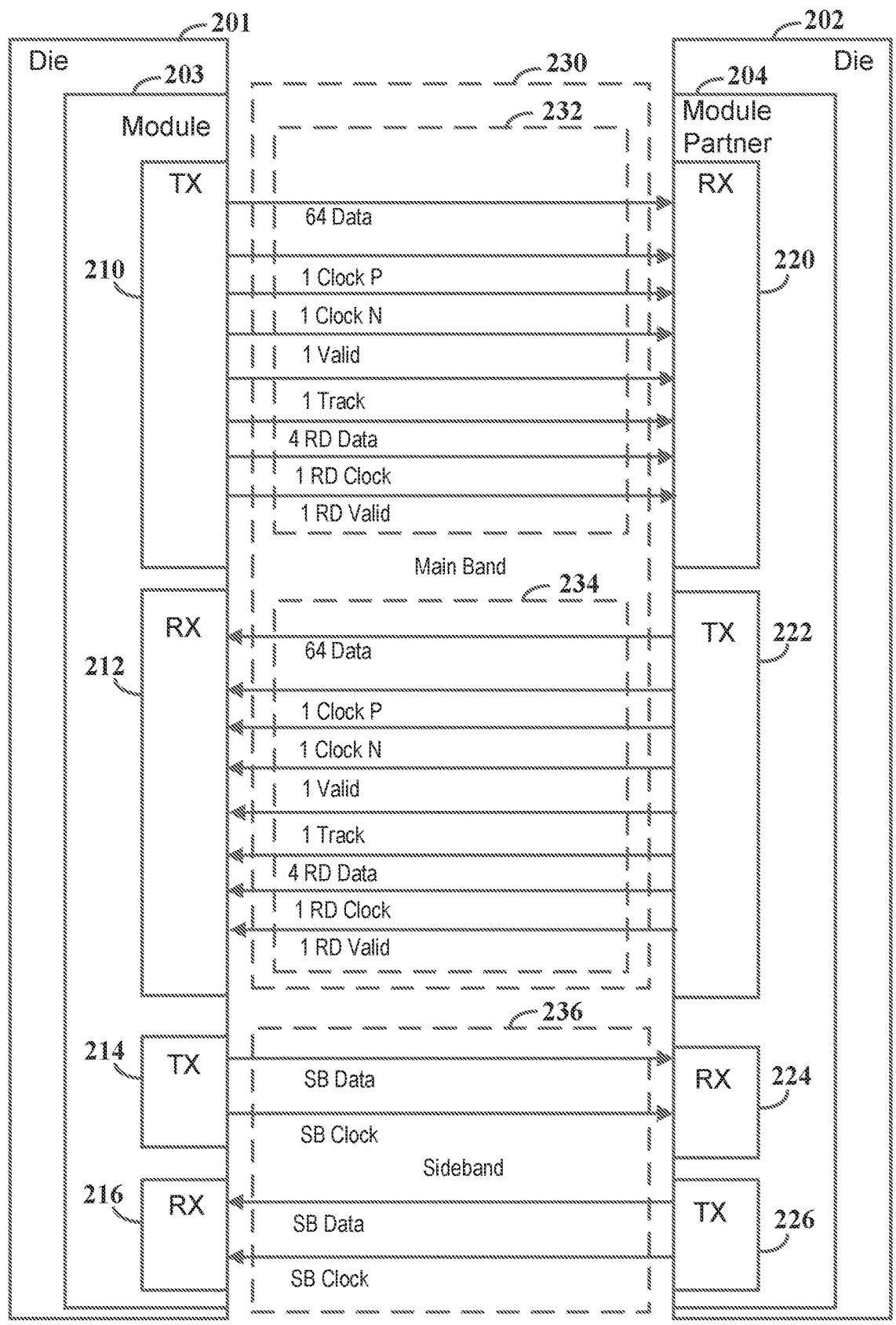
FIG. 2 is a block diagram of a module and a module partner coupled together with a 64 data lane die-to-die connection suitable for aspects of the present disclosure.

FIG. 2 is a block diagram of a first die 201 with a module 203 and second die 202 with a module partner 204 coupled together with a 64-lane die-to-die connection 200, e.g., a UCIe Advanced package interconnect, according to some aspects. The module 203 has a main band transmitter 210 that is connected to a transmit part 232 of a main band 230. The transmit part 232 includes 64 transmit data lines, a clock P line, a clock N line, a valid line, and a track line. The Advanced package main band transmit part 232 also includes 4 redundant data lines (RD Data) a redundant clock line (labeled RD Clock and referred to as TRDCK), and a redundant valid line (RD Valid). The redundant lines are configured for use when one or more of the primary data or clock lines fail. The transmit part 232 is coupled to a main band receiver 220 of the module partner 204. The module 203 has a main band receiver 212 that is connected to a receive part 234 of the main band 230. The receive part 234 includes 64 receive data lines, a clock P line, a clock N line, a valid line, a track line, 4 redundant data lines, a redundant clock line (referred to as RRDCK), and a redundant valid line. The receive part 234 is coupled to a main band transmitter 222 of the module partner 204.

The redundant clock lane is provided as a bidirectional repair mechanism in case of a fault on one of the clock lanes. A fault on either one of the clock lanes, P, N, will lead to configuring the redundant clock lane to replace the faulty clock lane. The track lane may also be remapped as a clock lane if another of the clock lanes fails. The redundant clock or track lane may also be remapped as a track lane if a track lane fails. The module also has a sideband transmitter 214 coupled through the sideband 236 of the die-to-die connection 200 to a sideband receiver 224 of the module partner 204. The sideband 236 may be the same or similar to the sideband example of FIG. 1. The module 203 has a sideband receiver 216 that is coupled through the sideband 236 of the die-to-die connection 200 to a sideband transmitter 226 of the module partner 204. The sideband has a bidirectional data lane and a bidirectional clock lane.

The particular numbers of lines are provided as examples in the context of UCIe 1.0 and different numbers of lines may be used to suit different die-to-die interconnections. In this Advanced package example, the 128 iterations of the training pattern are also performed for the redundant clock line and the redundant valid line in each direction adding still further to the time required for main band initialization. In other respects, processes discussed above with respect to FIG. 1 may be applied to this 64 data lane die-to-die connection.

Figure 3:
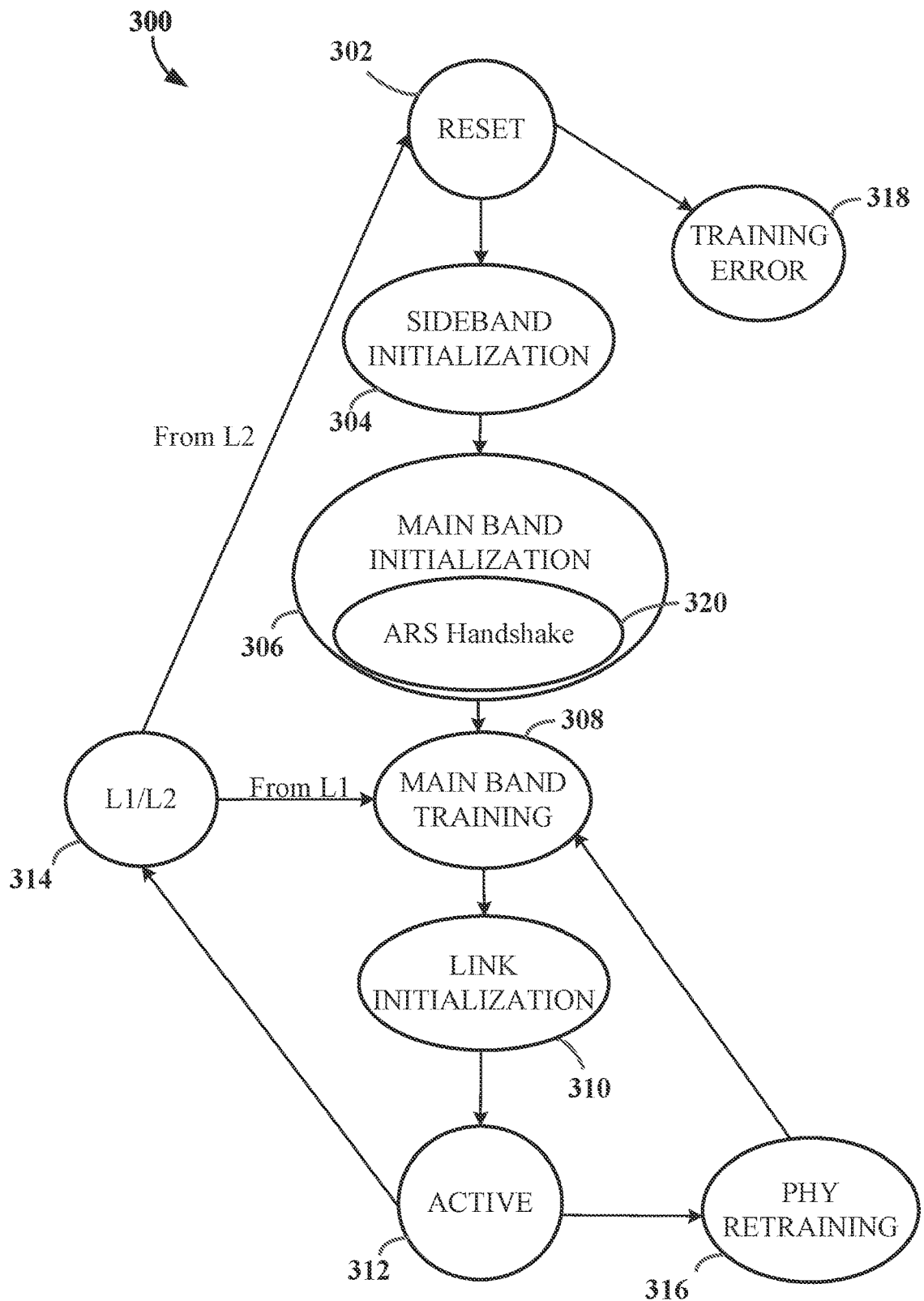
FIG. 3 is a diagram of a connection operation state machine according to aspects of the present disclosure.

FIG. 3 is a state machine diagram of a connection operation state machine 300, according to some aspects. The state machine is related to a link layer form of the physical layer connection, e.g., 100, 200 described above. The same state machine may be used for UCIe Advanced mode or Standard mode or other configurations with adaptations to accommodate the differences in the lanes, as described above. In UCIe 1.0, as a part of the MainBand link training, the module and the module partner must go through various phases of link initialization. First the link is in a reset state 302. The link stays in the reset state 302 for a minimum of 4 ms to allow the phase locked loops (PLLs) and other link transmitter and receiver components to stabilize. The link progresses through a SideBand initialization 304 (referred to as SBINIT), MainBand initialization 306 (referred to as MBINIT), MainBand training 308 (referred to as MBTRAIN), and link initialization 310 (referred to as LINKINIT) states, to come to an active state 312 (referred to as ACTIVE). The MBINIT state initializes the Clock P, Clock N, Track, Valid and data lanes in the UCIe Standard package. The MBINIT state initializes the Clock P, Clock N, Clock RD, Track, Valid, and data lanes in the UCIe Advanced package.

Considering FIG. 3, the state machine 300 begins with a reset state 302 which may be obtained upon startup or upon recovery from a deep sleep or low power state, e.g., L2 state 314, or to recover from a failure. The reset state 302 may also be entered by command from higher level layers of the die, e.g., a command to switch to different main band link width.

From the reset state 302, the state machine enters a sideband initialization state 304. The sideband is a low speed, high reliability part of the die-to-die connection. It is configured to be easily initialized even when there are other failures or difficult environmental conditions. After the sideband initialization state 304, the state machine may advance to a main band initialization state 306. The main band initialization state includes an Automatic Result Sharing (ARS) handshake sub-state 320. In some aspects, ARS may be supported and enabled for transmit and receive clock lines of the main band. These may be initialized in the main band initialization state 306 in preparation for the iterations of the training patterns that are sent in the main band training state 308. ARS support and enable parameters may be exchanged in sideband messages during the ARS handshake sub-state 320 and the parameters may be stored in a link configuration register.

After the main band initialization state 306 is completed, including the ARS handshake sub-state 320, the state machine advances to a main band training state 308. When training during Link bring up (i.e., Physical Layer transitions out of RESET state), the hardware is permitted to attempt training multiple times. After the main band training state 308, the state machine 300 advances to a link initialization state 310. The link initialization state 310 refers to the connections between the module and the module partner. After the link initialization state 310, the state machine moves to an active state 312 for data communication between the module and the module partner. The state machine continues in the active state 312 until some event requires a transition.

One type of transition is to a PHY retraining state 316. The PHY retraining state 316 allows for the PHY layer of the connection to be retrained in the event of errors, or changes in circumstances or conditions on the connection. As an example, a failure of a data line or loss of a clock line may cause the state machine to transition to the PHY retraining state 316 during the active state 312. A new configuration of data lines or clock lines may be trained in the PHY retraining state 316. After the PHY retraining state 316, the state machine returns to the main band training state 308 to train the new configuration of the main band and then to the link initialization state 310 and back to the active state 312 which has been recovered from the PHY retraining state 316.

The main band training state 308 may be entered upon various other triggers. As an example, a software application may write to a start UCIe link training bit in the UCIe Link Control. This may cause the state machine to transition to the PHY retraining state 316. The die-to-die adapter may trigger main band training based on a status of the physical adapter at the die or at the module partner. A signal failure on a sideband or a new cold boot initialization.

Another type of transition is to an L1/L2 state 314. The L1/L2 state 314 includes two different low power or standby conditions to accommodate inactivity on the die-to-die connection. In order to reduce power consumption, heat generation, and/or wear on the dies or the connection components, the state machine 300 can transition to an L1 standby which disables many of the components of the connection especially across the main band part. From the L1 standby of the L1/L2 state 314, the state machine 300 transitions to the main band training state 308. From the main band training state 308, the state machine transitions to the link initialization state 310 and back to the active state 312. The L2 standby is a deeper standby with more components, including clock shut down to save more power. From L2 standby, the state machine 300 transitions from the L1/L2 state 314 back to the reset state 302. From the reset state 302, the full process of state machine transitions is performed to reach the active state 312. There may be more or fewer standby or low power states than L1 standby and L2 standby to suit different implementations.

One further state is a training error state 318 reached as a transition from the reset state 302. This state is a dead end and results in an inoperable connection. If the module is restarted, then the module re-enters the reset state 302 and may be able to initialize or may return to the training error state 318.

Figure 4:
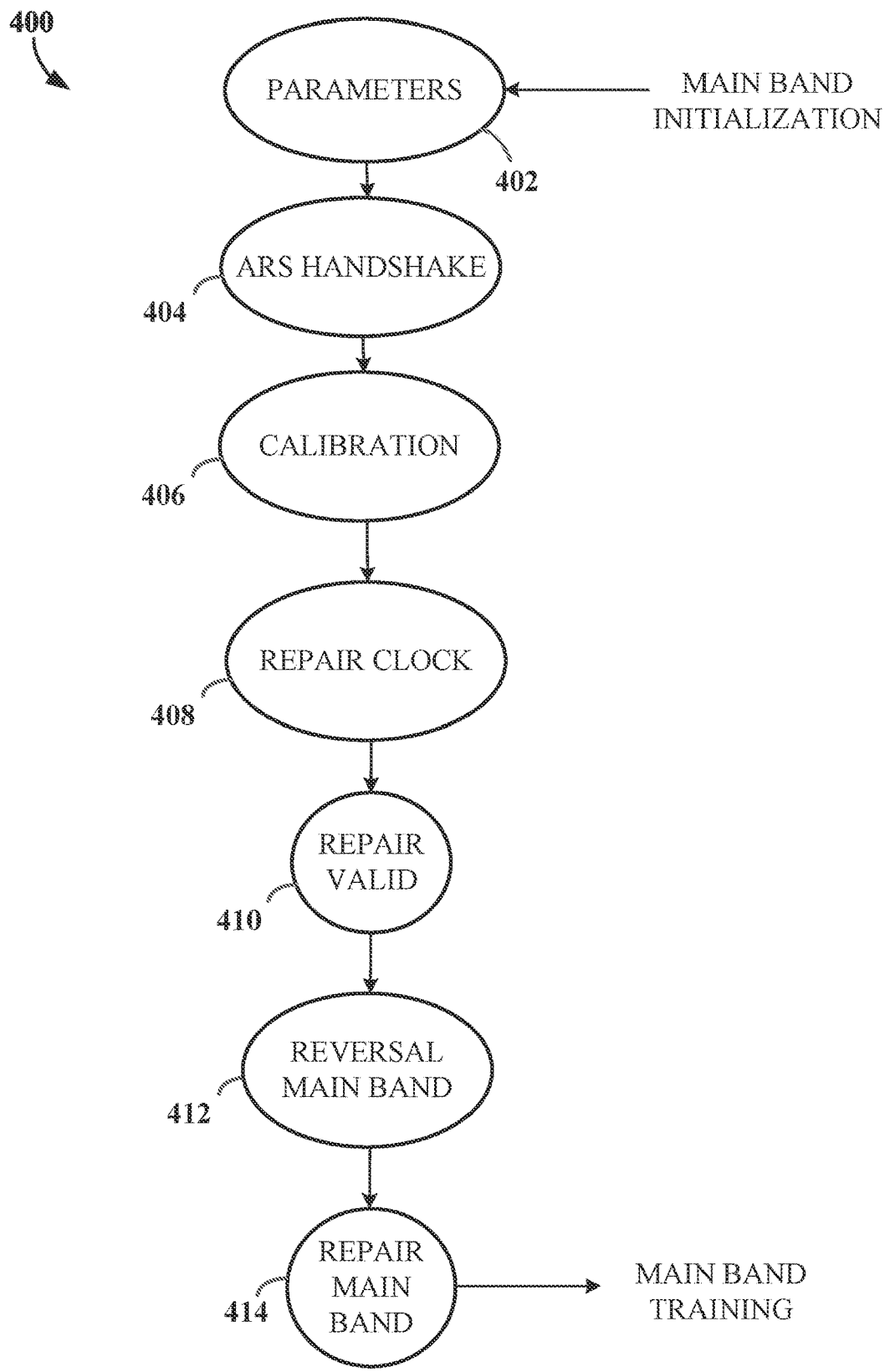
FIG. 4 is a diagram of main band initialization state machine according to aspects of the present disclosure.

FIG. 4 is a diagram of a main band initialization state machine 400 which provides additional detail about the main band initialization state 306 including the ARS handshake sub-state 320, according to some aspects. The main band initialization state machine 400 is entered by the main band initialization state to a parameters state 402 during which parameters for operation of the die-to-die connection are shared between the module and the module partner. Next, an ARS handshake state 404 includes sending an enable request through the sideband to enable ARS for training main band clock lines of the die-to-die connection and receiving an enable response through the sideband to enable ARS. The ARS handshake may also include sending a support request through the sideband to support the automatic result sharing and receiving a support response to support ARS. The support request may be done only once upon initialization or support may be pre-configured in some examples. The enable request may be sent in response to receiving the support request in the ARS handshake state 404 or during another state. The ARS handshake state 404 also includes setting parameters in link configuration registers to support ARS.

Following the ARS handshake state 404, a calibration state 406 is entered to calibrate the links to use the selected clock and data lanes. The repair clock state 408 follows the calibration state 406 and allows for training patterns to be sent and received between the module and the module partner to test the clock connections between the module and the module partner through the connection. The repair valid state 410 is used to train the valid lane which is used to frame the data on the data lines. The Valid signal is a type of clock signal.

The reversal main band state 412 allows for a test of the main band to determine if reversal should be applied to the data lanes of the main band connection. With reversal, lane 15 or lane 63 becomes lane 0 and the designation of the lanes counts through to lane 0 which becomes lane 15 or lane 63.

The repair main band state 414 is a training state of the main band data communication in which known patterns are transmitted on the data lanes to test each data lane for proper operation. Each data lane is tested in both the transmit data line and the receive data line. When a faulty data line is found in either direction through the repair main band state 414, then the link width may be modified to exclude the faulty data line. After completing the operations of the main band initialization state machine 400, the link training state machine then transitions out of the main band initialization state 306 to the main band training state 308 as shown in FIG. 3.

In UCIe 1.0, the data lanes are tested in the reversal main band state when the UCIe Module sends 128 iterations of a Per Lane ID pattern (LSB first) on all N MainBand data Lanes with correct, valid framing on the Valid Lane along with the forwarded clock. N is 68 (64 Data+4 RD) for the Advanced package interface and 16 for Standard Package interface. The UCIe Module Partner performs a per lane compare on its receivers on all N Lanes. Detection on a lane is considered successful if at least 16 consecutive iterations of the Per Lane ID pattern are detected. The UCIe Module Partner logs the detection result for its receive lines to be used for lane fault detection. After sending 128 iterations of the Per Lane ID pattern, the UCIe Module stops sending the pattern and sends a MBINIT.REVERSALMB result req sideband message to get the logged result. The UCIe Module Partner stops the comparison and responds with a MBINIT.REVERSALMB result resp sideband message with N-bit (68 for Advanced and 16 for Standard Package interface) per lane result.

Figure 5:
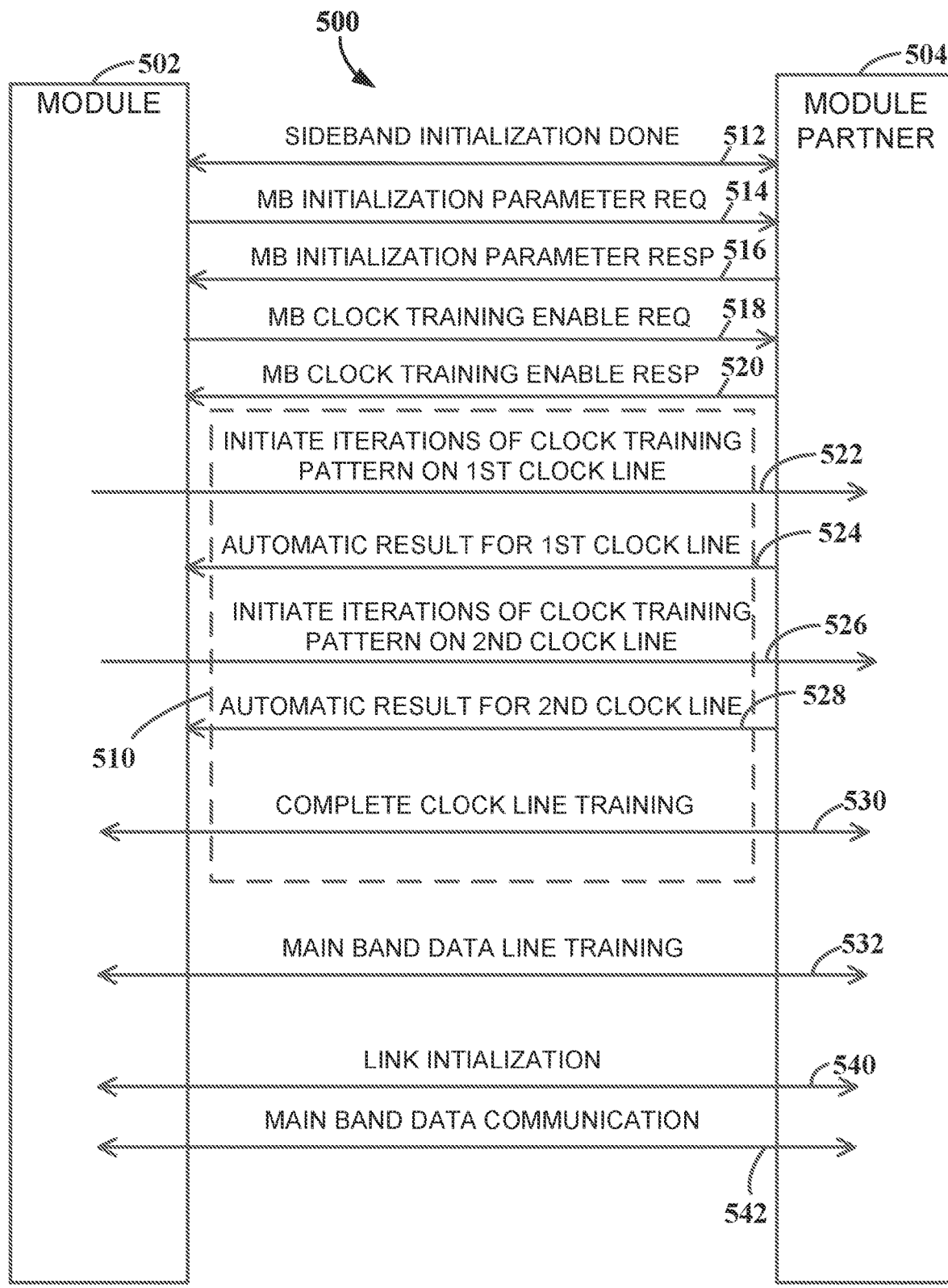
FIG. 5 is a signaling diagram of messages between a module and a module partner to initialize a main band with automatic result sharing according to aspects of the present disclosure.

FIG. 5 is a signaling diagram of messages between a module 502 of a first die and a module partner 504 of a second die to initialize a main band using automatic result sharing for main band clock lines, according to some aspects. The signaling 500 may be used when a die-to-die adapter processor moves from the reset state 302 of FIG. 3. This may occur, for example, on startup or in a transition from an L2 state 314. The signaling 500 begins after sideband initialization has been performed. The module and the module partner send messages of sideband initialization done 512. This corresponds to the end of the sideband initialization state 304 of FIG. 3. The module 502 then sends a main band initialization parameter request 514 to the module partner 504. The module partner 504 replies with a main band initialization parameter response 516. These are exchanged through the initialized sideband.

The module 502 and module partner 504 may use this response and request to include an automatic result sharing (ARS) handshake. An ARS handshake may be used to determine whether ARS is supported by including an ARS support parameter in the main band initialization parameter request 514 and an ARS support parameter in the main band initialization parameter response 516. An ARS enable parameter may also be included in the main band initialization parameter request 514 and the main band initialization parameter response 516. The parameters may include any other suitable ARS parameter or support and enablement may be communicated in another way. The parameters may then be stored in a link configuration register. In one example, ARS support is a part of the initial configuration and is not part of the ARS handshake. In one example, enablement is a part of the initial configuration and is not part of the ARS handshake.

In support of ARS, the module 502 then sends a main band clock training enable request 518 through the sideband to the module partner 504. The module partner 504 replies with a main band clock training enable response 520. The enable request requests that clock training begin and the response indicates that the module partner 504 is ready to receive iterations of the clock training pattern. The ARS enable parameter may be included in the main band clock training enable request 518 or it may have been sent earlier in the initialization process or included as part of the initial configuration.

In response to receiving the main band clock training enable response 520 from the module partner 504, the module 502 initiates iterations of a training pattern, e.g., a first training pattern from the module to the module partner on a first main band clock line 522. This may include disabling a main band clock line transmitter of other than the first main band clock line, e.g., tri-stating the other main band transmit clock lines at the module. The module partner detects the iterations of the clock training pattern on all of its receive clock lines simultaneously. The module partner may also detect the iterations of the clock training pattern on other receive lines. The detection is successful when the iterations of the clock training pattern are only detected on the intended clock line, e.g., the first main band clock line. When the training pattern is detected on multiple lines, then there is a short and one or more of the clock lines cannot be used. When the training pattern is not detected on any main band clock line, then there is a break and the clock line cannot be used.

UCIe 1.0 provides a more specific example for a parameter exchange. There is an exchange referred to as MBINIT.PARAM. Parameters for supporting and enabling ARS may be exchanged during this exchange or during a different operation. In UCIe 1.0 for both Standard package and Advanced package the MainBand initialization request message is referred to as MBINIT.PARAM configuration req. This is a sideband request to exchange parameters with the UCIe Module Partner. The request includes the parameters. The response from the module partner is referred to as MBINIT.PARAM configuration resp and is also a sideband message.

In UCIe 1.0, the clock repair process on each line includes 128 iterations of a clock repair pattern (referred to as CLKREPAIR or the VALTRAIN pattern). The clock repair pattern has 16 clock cycles followed by 8 cycles of low. The module partner receiver is required to detect at least 16 iterations of the training pattern to determine successfully receiving the training pattern. All of the transmit clock line iterations of the clock repair pattern are sent and then the module requests a report from the module partner in the form of a log of all of the received signals. For the six clock lines there will be a total of 768 iterations of the training pattern, then a request and response cycle. The module partner then sends iterations of the clock training pattern to the module on each one of the receive clock lines individually. The same process is repeated for the receive clock lines as for the transmit clock lines.

When ARS is supported, additional parameters may be added to the same sideband messages for support and enablement for the clock lines. In some examples, the valid lane may have separate and independent parameters. These parameters may include what are referred to as CLK_AR_Support, CLK_AR_Eanble, VAL_AR_Support, and VAL_AR Enable, wherein a value of "0" or low indicates that ARS is not supported or disabled and a value of "1" or high indicates that ARS is supported or enabled. These names are provided as examples and any other suitable names may be used instead.

For purposes of the present description, clock line refers to the lines labeled as clock, track, and valid, including any redundant lines. The training of all of the clock lines is referred to herein as the clock repair process 510. In some examples, the training pattern is only sent on some of the clock lines because others of the clock lines are already trained or will not be used. The iterations of the training patterns follow a known pattern so that the transmitter and receiver at each end are able to detect and train to the clock signal. Any other suitable clock training process may be used. The clock repair process 510 may be followed by main band data line training 532, then link initialization 540 and then main band data communication 542.

As described herein, the receiving module, e.g., the module partner 504 in FIG. 5, sends an automatic result for the first clock line 524, for the second clock line 528, etc. The module partner will send an automatic result for each of the clock lines after it has successfully received the training pattern on the respective clock line. If it does not successfully receive the training pattern then it will not send a result automatically. Instead, the module partner 504 will log results and then send a response (not shown) to a request from the module 502 for a report. If the result is sent automatically after 16-20 iterations of the training pattern and then the module 502 stops transmitting iterations on the first clock line 524 and starts sending iterations on the second clock line 526, then over 100 iterations of the training pattern are not sent on the first clock line. The module 502 receives the automatic result before all of the 128 iterations of the first training pattern and then moves to the next clock line. For six clock lines, more than 600 iterations of the training pattern are not sent. In many circumstances over 80% of the time normally required to send iterations of the training pattern for the clock lines is avoided. If the module partner 504 has automatically sent results for each clock line, then the module 502 has no need to request a report from the module partner 504. The time required for this handshake is also avoided. While the present description uses the example of 128 iterations sent and 16-20 iterations, in accordance with UCIe 1.0, received to declare success, any other numbers may be used. For example, the numbers may be changed for later versions of UCIe and for other die-to-die connections.

At 522, the module initiates iterations of a first training pattern from the module to the module partner on the first main band clock line. The module partner receives the iterations on its corresponding receive clock lines. The module partner may log the detection result on all of the clock lines. While the other transmit clock lines are disabled and may be tri-stated, the module partner is logging results on the corresponding receive clock lines and actively detecting whether the iterations of the first training pattern are being received also on the other clock lines. If the iterations of the first training pattern on the first clock line are received successfully, then the module partner 504 sends an automatic result for the first clock line 524. When the module receives the automatic result, there is no longer any need to continue sending iterations of the clock training pattern on the first clock line. Accordingly, the module stops sending iterations of the first clock line and now initiates iterations of the clock training pattern on the second clock line 528.

The module partner 504 again detects the iterations of the clock training pattern on one or more of its receive clock lines and, if the iterations of the clock training pattern are successfully received, then it sends an automatic result for the second clock line 528. The module 502 may then move to a third clock line and initiate iterations of the clock training pattern on the third clock line. This continues through redundant clock lines, track lines, and valid lines in both directions, from module to module partner and from module partner to module, until clock line training has been completed 530.

The clock repair process 510 is completed and the signaling 500 continues to main band data line training 532. Link initialization 540 corresponds to the link initialization state 310 of FIG. 3. With the main band initialized, the signaling continues to communicating data with the module partner with the main band data communication 542 using at least the first main band clock line. This corresponds to the active state 312 in FIG. 3.

Table 1 is an example of a portion of a link configuration register, referred to herein as config_reg, that may be configured to support automatic result sharing (ARS) for a main band, e.g., a MainBand for the Advanced package or a MainBand for the Standard package. More registers may be added to accommodate more link variations and for other connection configurations. In some aspects, the value in each position is set to zero by default and upon initiation. During the main band initialization state 306 and, in particular the ARS handshake sub-state 320, described above, a sideband support request is sent to the module partner to support ARS for the main band clock lines. This may be a part of the main band initialization parameter request 514 and may include a support parameter. Upon receiving a sideband support response from the module partner, shown as the main band initialization parameter response 516, which may include a support parameter, a support bit may be added to the configuration register.

In Table 1, there is a support bit for the clock lines CLK_AR_Support, and a support bit for the valid lines, VAL_AR_Support. In UCIe 1.0, the clock lines and track lines have one form of clock training pattern and the valid lines have a second different form of valid training pattern. However, this is not required and does not require that support or enablement be established independently. In an example, when the support bits are both "1" or high, the two dies support ARS for all of the clock lines, including the valid lines. In an example, when these are both "0" or low, then the two dies do not support ARS for either the clock or valid lines.

Upon receiving a sideband enable response from the module partner, shown as the main band clock training enable response 520, and the main band valid training enable response 620, the remaining link configuration parameters of Table 1 may be set for clock lines and valid lines respectively. In particular CLK_AR_Enable indicates whether ARS is enabled for the main band clock lines. VAL_AR_Enable indicates whether ARS is enabled for the main band valid lines. As mentioned above, a single enable bit may be used for all of the clock lines including the valid lines.

TABLE 1

| CLK_config_reg | CLK_AR_Support | CLK_AR_Enable |
|---|---|---|
| VAL_config_reg | VAL_AR_Support | VAL_AR_Enable |

When the CLK_AR_Enable bit is set to "1" or high then the module partner is configured to send an automatic report before the module completes the iterations of the clock line training pattern on each main band clock line. Similarly, when the VAL_AR_Enable bit is set to "1" or high then then the module partner is configured to send an automatic report before the module completes the iterations of the valid line training pattern on each main band valid line.

Table 2 is an example of an ARS operation selection table configured to determine the operation of ARS using the configuration register bits of Table 1. When CLK_AR_Support is low as in row 1, then there is no ARS for the clock lines. Similarly, when VAL_AR_Support is low as in row 4, there is no support for ARS for the valid lines. In the example of Table 2, ARS for the valid lines is independent of the clock lines but there may be a single support bit and a single enable bit, or ARS may be supported for the valid lines only if ARS is also supported for the clock lines. In other words, there are three states as determined from Table 2, no ARS, ARS for clock lines only, and ARS for clock lines and valid lines. Other configurations may also be made. In an example, if CLK_AR_Support is high as in rows 2 and 3, then CLK_AR_Enable determines whether ARS is disabled as in row 2 or enabled as in row 3 and shown in FIG. 5. Similarly, if VAL_AR_Support is high as in rows 5 and 6, then VAL_AR_Enable determines whether ARS is disabled as in row 5 or enabled as in row 6 and shown in FIG. 6. More or fewer bits may be used to represent more or fewer ARS selections for main band lines.

TABLE 2

| CLK_AR_Support | CLK_AR_Enable | VAL_AR_Support | VAL_AR_Enable | Comment |
|---|---|---|---|---|
| 0 | X | | | Default-No CLK ARS |
| 1 | 0 | | | CLK ARS supported, disabled |
| 1 | 1 | | | CLK ARS enabled |
| | | 0 | X | Default-No VAL ARS |
| | | 1 | 0 | VAL ARS supported, disabled |
| | | 1 | 1 | VAL ARS enabled |

Figure 6:
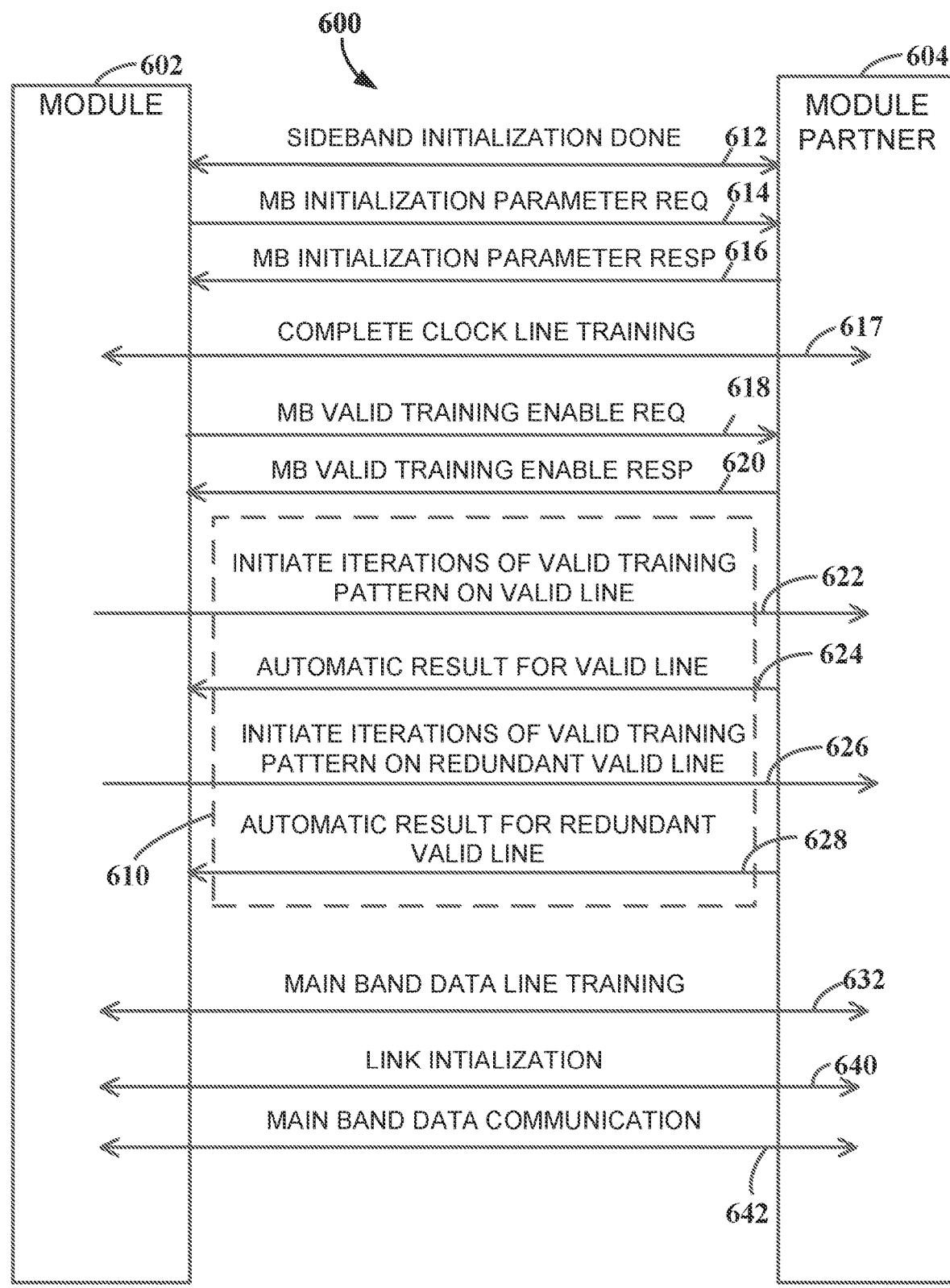
FIG. 6 is a signaling diagram of messages between a module and a module partner to initialize a main band with automatic result sharing and train a valid line according to aspects of the present disclosure.

FIG. 6 is a signaling diagram of messages between a module 602 of a first die and a module partner 604 of a second die to initialize a main band using automatic result sharing for main band valid lines, according to some aspects. The signaling 600 may be used when a die-to-die adapter processor moves from the reset state 302 of FIG. 3. This may occur, for example, on startup or in a transition from an L2 state 314. The signaling 600 begins after sideband initialization has been performed. The module and the module partner send messages of sideband initialization done 612. This corresponds to the end of the sideband initialization state 304 of FIG. 3. The module 602 then sends a main band initialization parameter request 614 to the module partner 604. The module partner 604 replies with a main band initialization parameter response 616. These are exchanged through the initialized sideband.

The module 602 and module partner 604 may use this response and request to include an automatic result sharing (ARS) handshake. An ARS handshake may be used to determine whether ARS is supported by including an ARS support parameter in the main band initialization parameter request 614 and an ARS support parameter in the main band initialization parameter response 616. An ARS enable parameter may also be included in the main band initialization parameter request 614 and the main band initialization parameter response 616. The parameters may include any other suitable ARS parameter or support and enablement may be communicated in another way. The parameters may then be stored in a link configuration register. In one example, ARS support is a part of the initial configuration and is not part of the ARS handshake. In one example, enablement is a part of the initial configuration and is not part of the ARS handshake.

In support of ARS, the module 602 then sends a main band valid training enable request 618 through the sideband to the module partner 604. The module partner 604 replies with a main band valid training enable response 620. The enable request requests that valid line training begin and the response indicates that the module partner 604 is ready to receive iterations of the valid training pattern. The ARS enable parameter may be included in the main band valid training enable request 618 or it may have been sent earlier in the initialization process or included as part of the initial configuration.

As shown, clock line training is completed 617 before the main band valid training enable request 618. This clock line training may be performed as shown in FIG. 5. The clock line training of FIG. 5 may include valid line training as another clock line or valid lines may be trained independently, as shown in FIG. 6.

In response to receiving the main band valid training enable response 620 from the module partner 604, the module 602 initiates iterations of a valid training pattern, e.g., a valid training pattern from the module to the module partner on a main band valid line 622. The valid line training will happen along with the forward clock training. The module partner detects the iterations of the valid training pattern on all of its receive clock lines simultaneously. The module partner may also detect the iterations of the valid training pattern on other receive lines. The detection is successful when the iterations of the valid training pattern are only detected on the intended clock line, e.g., the main band valid line. When the training pattern is detected on multiple lines, then there is a short and one or more of the valid lines cannot be used. When the training pattern is not detected on any main band clock line, then there is a break and the valid line cannot be used.

UCIe 1.0 provides a more specific example for a parameter exchange also with respect to the valid line. In UCIe 1.0, the transmitter sends 128 iterations of a valid training (VALTRAIN) pattern, which has four 1's followed by four 0's on the valid line in each direction along with the forwarded clock. Detection is considered successful if at least 16 consecutive iterations of the VALTRAIN pattern are detected. As with CLKREPAIR, the module partner logs 4 more iterations and then is able to respond with a log result upon request from the module.

The valid training pattern may include an initialization request and response followed by the valid training pattern that is sent in each direction and on each clock line in sequence along with training the forward clock. The training of the valid line and the redundant valid line is referred to herein as the valid line repair process 610. In the Standard Package there is only one valid line and no redundant valid line. The iterations of the valid training patterns follow a known pattern so that the transmitter and receiver at each end are able to detect and train to the valid signal. Any other suitable valid training process may be used. The valid line repair process 610 may be followed by main band data line training 632, then link initialization 640, and then main band data communication 642.

As described herein, the receiving module, e.g., the module partner 604 in FIG. 6, sends an automatic result for the valid line 624, for the redundant valid line 628, etc. The module partner will send an automatic result for each of the clock lines after it has successfully received the training pattern on the respective valid line. If it does not successfully receive the training pattern then it will not send a result automatically. Instead, the module partner 604 will log results and then send a response (not shown) to a request from the module 602 for a report. This report may include a log for all of the clock lines after the clock line training is completed 617.

If the iterations of the first training pattern on the valid line are received successfully, then the module partner 604 sends an automatic result for the valid line 624. When the module receives the automatic result, there is no longer any need to continue sending iterations of the valid training pattern on the valid line. Accordingly, the module stops sending iterations of the valid line and now initiates iterations of the valid training pattern on the redundant valid line 626.

The module partner 604 again detects the iterations of the valid training pattern on one or more of its receive clock lines and, if the iterations of the valid training pattern are successfully received, then it sends an automatic result for the redundant valid line 628. The valid line repair process 610 is completed and the signaling 600 continues to main band data line training 632. Link initialization 640 corresponds to the link initialization state 310 of FIG. 3. With the main band initialized, the signaling continues to communicating data with the module partner through the main band data communication 642 using the main band clock lines. This corresponds to the active state 312 in FIG. 3.

Figure 7:
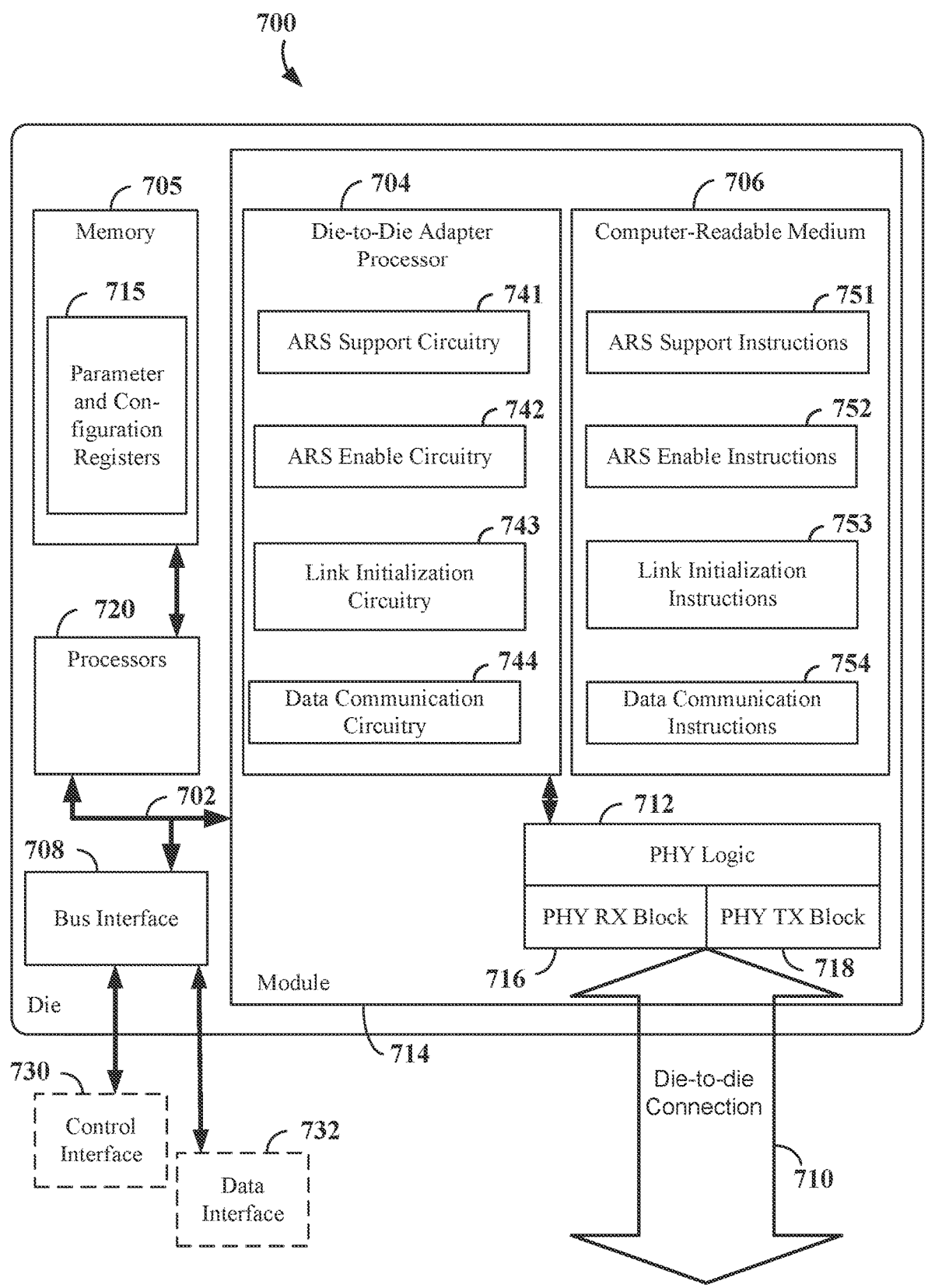
FIG. 7 is a block diagram of a die with a module according to aspects of the present disclosure.

FIG. 7 is a block diagram of an example of a hardware implementation for a die 700 e.g., a central processor, a graphics processor, a special purpose processor, a volatile memory, a non-volatile memory, an input/output controller, or any other suitable components with a die-to-die connection 710 having a sideband and a main band. In this example, the die has processors 720 for performing the primary operations of the die and a memory 705. The die has a module 714 to support a die-to-die connection 710 with a die-to-die adapter processor 704, a computer-readable medium 706, PHY logic 712, a PHY receive block 716 and a PHY transmit block 718. The die-to-die adapter processor 704 performs the operations described above to service the die-to-die connection 710 between the die 700 and one or more other dies (not shown).

In accordance with various aspects of the disclosure, an element, or any portion of an element, or any combination of elements may be implemented with the module 714. Examples of the module 714 include microprocessors, microcontrollers, digital signal processors (DSPs), field programmable gate arrays (FPGAs), programmable logic devices (PLDs), state machines, gated logic, discrete hardware circuits, and other suitable hardware configured to control the die-to-die connection 710 and the clocking modes as described throughout this disclosure. In various examples, the die 700 may be configured to perform any one or more of the functions described herein. The die contains other components (not shown) configured to perform other functions of the die as is suitable for the type of die.

In this example, the module has a module with a processor 720 for performing the primary operations of the module, a memory 705, and a computer-readable medium 706. A die-to-die adapter processor 704 performs the operations described above to service the interconnection between the module 714 and a module partner or another module. In accordance with various aspects of the disclosure, an element, or any portion of an element, or any combination of elements may be implemented with the module 714. Examples of the processor include a central processor, a graphics processor, a special purpose processor, a memory controller, and an input/output controller. Examples of the die-to-die adapter processor 704 include microprocessors, microcontrollers, digital signal processors (DSPs), field programmable gate arrays (FPGAs), programmable logic devices (PLDs), state machines, gated logic, discrete hardware circuits, and other suitable hardware configured to control the die-to-die connection and the clocking modes as described throughout this disclosure. In various examples, the module 714 may be configured to perform any one or more of the functions described herein. The module contains other components (not shown) configured to perform other functions of the module as is suitable for the type of die.

In this example, the die 700 may be implemented with a bus architecture, represented generally by the bus 702. The bus 702 may include any number of interconnecting buses and bridges depending on the specific application of the module 714, the die 700 and the overall design constraints. The bus 702 communicatively couples together various circuits including processors 720, the die-to-die adapter processor 704, the memory 705, and the computer-readable media (represented generally by the computer-readable medium 706) having instructions stored thereon. The bus 702 may also link various other circuits such as timing sources, peripherals, data buffers, modules, power management circuits, and other processing cores, which are not described any further. A bus interface 708 provides an interface between the bus 702 and other optional external interfaces e.g., a control interface 730 and a data interface 732, etc. The processors 720 are a higher layer with respect to the die-to-die adapter processor 704 and coupled to the die-to-die adapter processor through the bus 702. The processors 720 may communicate operations, administration, or management control with the die-to-die adapter processor 704 or the die-to-die adapter processor 704 may operate autonomously. In some examples, the die-to-die adapter receives a request to reduce a data rate of the main band from a higher layer, e.g., the processors 720/

The control interface 730 may be used to provide a communication interface or means of communicating with various other apparatuses and devices (for example, other devices housed within the same package or system) over an internal bus or external transmission medium, such as command and control interface for power regulation, power-on test, and other purposes. The data interface 732 may be used to provide data connections other than the die-to-die connection 710 to other types of components within the package or system. The control interface 730 and the data interface 732 may be connected to a higher layer to receive reset and configuration commands that may cause the die-to-die processor to switch to a single clock mode.

The module 714 includes a PHY receive block 716 that corresponds to the sideband and main band receivers described above and a PHY transmit block 718 that corresponds to the sideband and main band transmitters described above. The PHY transmit block 716 and the PHY receive block 718 are coupled to the die-to-die connection 710 that corresponds to the physical part of the sideband 136 and main band 130 lanes described above that couple the first die 101 and the second die 102 through pins on respective die connectors. The module also includes PHY logic 712 which may include the link logic to control the data applied to each line and the state machines described above under the control of the die-to-die adapter processor. The PHY logic 712 may also include clock generators coupled to clock sources to generate the sideband and main band clock signals as described above.

The die-to-die adapter processor 704 is responsible for managing the PHY logic 712 and for interface processing, including the execution of software stored on the computer-readable medium 706. The software, when executed by the die-to-die adapter processor 704, causes the module 714 to perform the various functions described below for any particular apparatus. The computer-readable medium 706 and the memory 705 may also be used for storing data that is manipulated by the die-to-die adapter processor 704 when executing software.

The die-to-die adapter processor 704 may be a part of the processors 720 or of one or more other processor cores of the die 700 (not shown) and perform operations by means of a processor core executing software stored in the computer-readable medium 706, or the die-to-die adapter processor 704 may be independent of any other processing resources of the die 700 to execute software stored on the computer-readable medium 706 using its own processing resources. Software shall be construed broadly to mean instructions, instruction sets, code, code segments, program code, programs, subprograms, software dies, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The die-to-die adapter processor 704 controls the operations performed by state machines, e.g., those of FIGS. 3 and 4, and causes the signaling 500, 600 of the signaling diagrams and causes the clock repair training patterns to be transmitted and received.

The computer-readable medium 706 may be a non-transitory computer-readable medium. A non-transitory computer-readable medium includes, by way of example, a magnetic storage device, a flash memory device, a random access memory (RAM), a read only memory (ROM), a programmable ROM (PROM), an erasable PROM (EPROM), an electrically erasable PROM (EEPROM), a register, and any other suitable medium for storing software and/or instructions that may be accessed and read by a controller. The computer-readable medium 706 may reside in the module 714 or another part of the die 700. The computer-readable medium 706 may be embodied in a firmware for the operation of a state machine or parameters of an ASIC. Those skilled in the art will recognize how best to implement the described functionality presented throughout this disclosure depending on the particular application and the overall design constraints imposed on the overall system.

The die 700 may be configured to perform any one or more of the operations described herein. In some aspects of the disclosure, the die-to-die adapter processor 704, as utilized in the die 700, may include circuitry configured for various functions. The die-to-die adapter processor 704 is coupled to the memory 705 through the bus 722. The memory 705 includes parameter and configuration registers 715 that may include parameters for different link widths for the data lanes as shown in Table 1 and in Table 2. Any other parameters and configuration values may also be stored including those for the operation of the main band in PCIe or CXL operation.

The die-to-die adapter processor 704 may include ARS support circuitry 741 to send requests and receive responses with a module partner to support ARS for clock lanes of a main band and to set a support parameter in a link configuration register of the parameter and configuration registers 715. The ARS support circuitry 741 may include one or more hardware components that provide the physical structure that performs various processes related to sending requests and receiving responses with a module partner to support ARS and to set a support parameter. The ARS support circuitry 741 may include functionality for a means for sending a support request to a module partner and a means for receiving a support response from the module partner through a sideband to support ARS for clock lanes of a main band and means for setting a support parameter in a link configuration register of the parameter and configuration registers 715. The ARS support circuitry 741 may further be configured to execute ARS support instructions 751 included on the computer-readable medium 706 to implement the ARS support described herein.

The die-to-die adapter processor 704 may include ARS enable circuitry 742 configured to send and receive enable requests to the module partner and receive enable responses from the module partner through the sideband. The enable request is to enable automatic result sharing from a receiver, e.g., a module partner, to a transmitter, e.g., a module, as discussed herein. The ARS enable circuitry 742 may include functionality for a means responsive to a command or table inference from e.g., Table 2 to enable ARS and to send and receive requests and responses to enable ARS. The ARS enable circuitry may further set parameters for operating ARS in a link configuration register. The ARS enable circuitry 742 may further be configured to execute ARS enable instructions 752 included on the computer-readable medium 706 to implement one or more functions described herein.

The module 714 die-to-die adapter processor 704 may include link initialization circuitry 743 configured to perform operations initializing a main band at a specified transmit link width and a specified receive link width as discussed herein. The link initialization circuitry 743 may include functionality for initializing the link and may also include functionality for main band clock training and main band data line training. The link initialization circuitry 743 may include functionality for a means for receiving an automatic result in response to sending iterations of a training pattern on a clock line. The link initialization circuitry 743 may further be configured to execute link initialization instructions 753 included on the computer-readable medium 706 to implement one or more functions described herein.

The die-to-die adapter processor 704 may include data communication circuitry 744 configured to communicate data with another module through a main band connection of the die-to-die connection 710 using the initialized main band with the clock training process, as discussed herein. The data communication circuitry 744 may include functionality for a means for communicating data with another module through a main band connection. The data communication circuitry 744 may further set parameters for operating using clock lanes in accordance with a link configuration register. The data communication circuitry 744 may further be configured to execute data communication instructions 754 included on the computer-readable medium 706 to implement one or more functions described herein.

The circuit architecture described herein may be implemented on one or more ICs, chips, chiplets, modules, interposers, packages, system printed circuit boards (PCBs), etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

Figure 8:
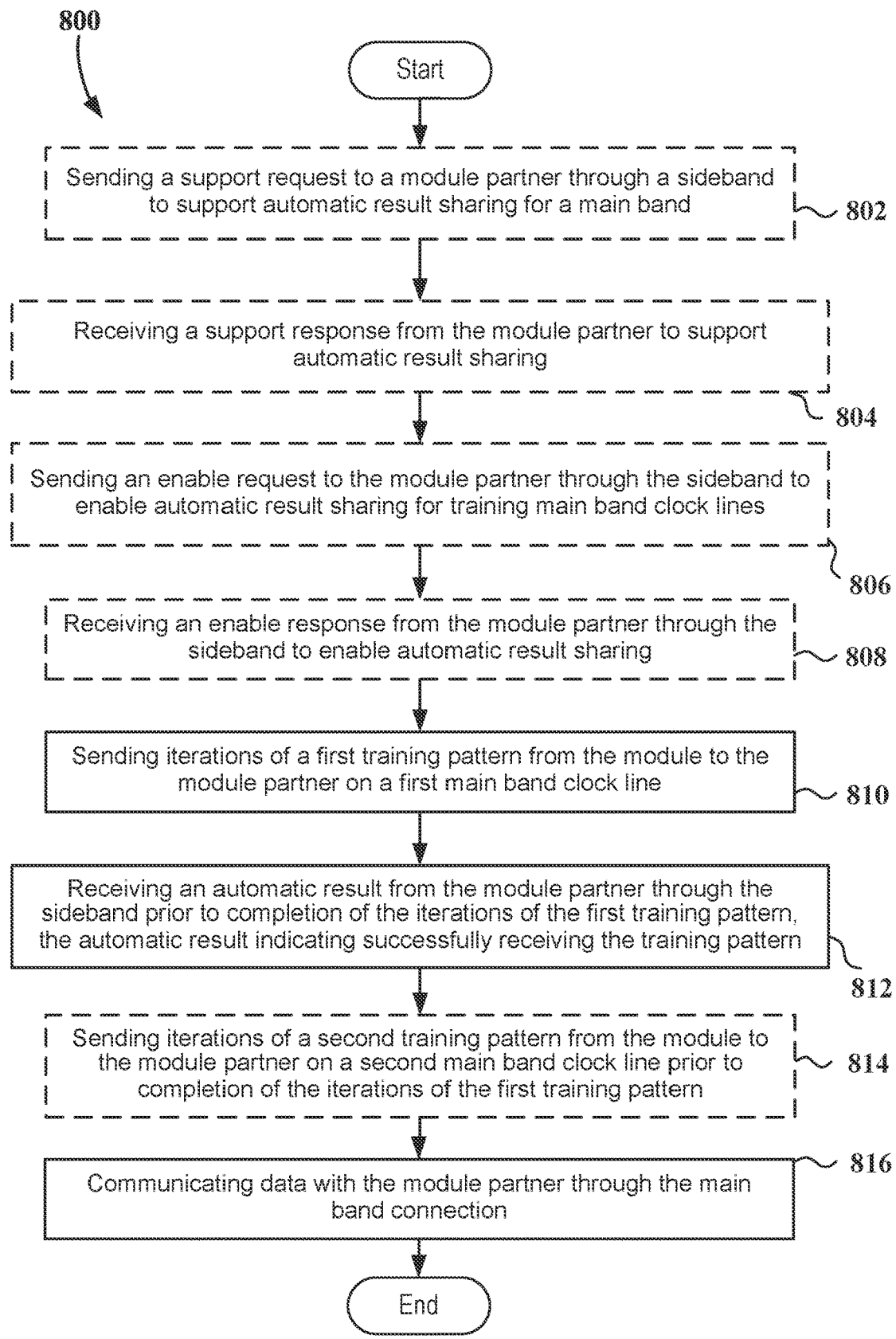
FIG. 8 is a flow diagram of aspects of operating a die-to-die connection with automatic result sharing according to aspects of the present disclosure.

FIG. 8 is a process flow diagram illustrating an example of a method for automatic result sharing for clock lanes of a main band with a die-to-die connection such as the connections of FIGS. 1 and 2. The method may be performed in the die-to-die adapter processor 704 of FIG. 7 or other circuitry, and software as described in the context of FIG. 7. The method 800 optionally begins at block 802 with sending a support request to a module partner through a sideband to support automatic result sharing (ARS) for a main band. Sending the support request may be performed during a main band initialization. Alternatively, the dies may be configured to support ARS without any handshake of support parameters.

Responsive to the request message, the module partner may optionally send a response. The method 800 continues in block 804 with optionally receiving a support response from the module partner through the sideband to support ARS for the main band.

In block 806, sending an enable request to the module partner through the sideband to enable ARS for training main band clock lines is optionally performed. The module partner may then optionally perform receiving an enable response from the module partner through the sideband to enable ARS for training the main band clock lines at block 808. The enable request may include ARS for valid lines together with clock and track lines or a separate ARS handshake may be performed for valid lines. The enable request may relate to specified clock lines or to all lines in single request. These operations may also be performed at another time or the module and module partner maybe pre-configured to have ARS enabled.

In block 810, sending iterations of a first training pattern from the module to the module partner on a first main band clock line is performed. In block 812, receiving an automatic result from the module partner prior to completion of the iterations of the first training pattern, the automatic result indicating successfully receiving the training pattern is performed. In some aspects, there is no automatic result for some clock lines and a report is requested for a log of all received training patterns.

After an automatic result is received, sending iterations of a second training pattern from the module to the module partner on a second main band clock line is optionally performed at 814 for any other clock lines before completing the iterations of the first training pattern. In this way, the automatic result from the module partner reduces the number of iterations of the first training pattern. In block 816, communicating data with the module partner through the main band is performed in response to receiving the automatic result.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Combinations of the above should also be included within the scope of computer-readable media.

The following provides an overview of examples of the present disclosure.

Example 1: A method comprising sending iterations of a first training pattern from a module of a first die to a module partner of a second die on a first main band clock line of a die-to-die connection that connects the module to the module partner, the die-to-die connection including a sideband, a main band comprising the first main band clock line, and at least one data line supported by at least the first main band clock line, receiving an automatic result from the module partner through the sideband prior to completion of the iterations of the first training pattern, the automatic result indicating successfully receiving the training pattern, and communicating data with the module partner through the main band using at least the first main band clock line in response to receiving the automatic result.

Example 2: The method of example 1, further comprising ceasing sending iterations of the first training pattern in response to receiving the automatic result.

Example 3: The method of example 1 or 2, further comprising sending iterations of a second training pattern from the module to the module partner on a second main band clock line prior to completion of the iterations of the first training pattern and in response to receiving the automatic result.

Example 4: The method of any one or more of the above examples, wherein the first training pattern is a clock repair pattern.

Example 5: The method of any one or more of the above examples, wherein the first training pattern is a valid line training pattern.

Example 6: The method of any one or more of the above examples, wherein sending iterations of a first training pattern comprises disabling a main band clock line transmitter of other than the first main band clock line.

Example 7: The method of any one or more of the above examples, wherein sending iterations of the first training pattern comprises sending 128 iterations thereof and wherein receiving the automatic result comprises receiving the automatic result before all of the 128 iterations of the first training pattern and after 16 iterations of the first training pattern.

Example 8: The method of any one or more of the above examples, further comprising sending an enable request from the module through the sideband to enable automatic result sharing for training main band clock lines, and receiving an enable response from the module partner through the sideband to enable automatic result sharing.

Example 9: The method of any one or more of the above examples, wherein sending iterations of the first training pattern is in response to the receiving the enable response.

Example 10: The method of example 8, wherein the sending the enable request comprises sending the enable request during a main band initialization.

Example 11: The method of example 8 or 9, further comprising storing in a link configuration register an enable bit indicating that automatic result sharing is enabled for training main band clock lines.

Example 12: The method of example 8, 9, or 10, further comprising sending a support request to the module partner through the sideband to support the automatic result sharing, and receiving a support response from the module partner to support the automatic result sharing, wherein the sending the enable request is in response to receiving the support response.

Example 13: The method of example 10, wherein the sending the support request comprises sending an automatic result sharing support parameter, the method further comprising storing the automatic result sharing support parameter in a configuration register in response to receiving the support response.

Example 14: The method of example 13, wherein the automatic result sharing parameter identifies a clock line of the main band through which the iterations of the first training pattern are sent.

Example 15: The method of example 13 or 14, wherein the sending the enable request comprises sending the enable request in response to an automatic result sharing support parameter being present in a configuration register.

Example 16: A non-transitory computer-readable medium having instructions stored therein for causing a processor of a die to perform operations comprising sending iterations of a first training pattern from a module of a first die to a module partner of a second die on a first main band clock line of a die-to-die connection that connects the module to the module partner, the die-to-die connection including a sideband, a main band comprising the first main band clock line, and at least one data line supported by at least the first main band clock line, receiving an automatic result from the module partner through the sideband prior to completion of the iterations of the first training pattern, the automatic result indicating successfully receiving the training pattern, and communicating data with the module partner through the main band using at least the first main band clock line in response to receiving the automatic result.

Example 17: The computer-readable medium of example 16, the operations further comprising ceasing sending iterations of the first training pattern in response to receiving the automatic result.

Example 18: The computer-readable medium of example 16 or 17, the operations further comprising sending iterations of a second training pattern from the module to the module partner on a second main band clock line prior to completion of the iterations of the first training pattern and in response to receiving the automatic result.

Example 19: The computer-readable medium of any one or more of examples 16-18, the operations further comprising sending an enable request from the module through the sideband to enable automatic result sharing for training main band clock lines; and receiving an enable response from the module partner through the sideband to enable automatic result sharing.

Example 20: An apparatus comprising a main band transmitter of a module of a first die configured to send iterations of a first training pattern from a module of a first die to a module partner of a second die on a first main band clock of a die-to-die connection that connects the module to the module partner, the die-to-die connection including a sideband, a main band comprising the first main band clock line, and at least one data line supported by at least the first main band clock line, and a sideband receiver of the module configured to receive an automatic result from the module partner through the sideband prior to completion of the iterations of the first training pattern, the automatic result indicating successfully receiving the training pattern, the main band transmitter further configured to communicate data with the module partner through the main band using at least the first main band clock line in response to receiving the automatic result.

Example 21: The apparatus of example 20, wherein the iterations of the first training pattern comprise 128 iterations thereof and wherein the sideband receiver is configured to receive the automatic result before all of the 128 iterations of the first training pattern and after 16 iterations of the first training pattern.

Example 22: The apparatus of example 20, further comprising a link configuration register, and a processor configured to store an enable bit in the configuration register indicating that automatic result sharing is enabled for training main band clock lines.

Example 23: The apparatus of example 22, wherein the automatic result sharing parameter identifies a clock line of the main band through which the iterations of the first training pattern are sent.

What is claimed is:

1. A method comprising:
    sending iterations of a first training pattern from a module of a first die to a module partner of a second die on a first main band clock line of a die-to-die connection that connects the module to the module partner, the die-to-die connection including a sideband, a main band comprising the first main band clock line, and at least one data line supported by at least the first main band clock line;
    receiving a training result from the module partner through the sideband prior to completion of the iterations of the first training pattern, the training result indicating successfully detecting the training pattern on the first main band clock line prior to completion of the iterations of the first training pattern;
    ceasing sending iterations of the first training pattern in response to the receiving the training result; and
    communicating data with the module partner through the main band using at least the first main band clock line in response to receiving the training result.

2. The method of claim 1, wherein receiving the training result comprises receiving the training result before sending a request for a training report to the module partner.

3. The method of claim 1, further comprising sending iterations of a second training pattern from the module to the module partner on a second main band clock line prior to completion of the iterations of the first training pattern and in response to the receiving the training result.

4. The method of claim 1, wherein the first training pattern is a clock repair pattern.

5. The method of claim 1, wherein the first training pattern is a valid line training pattern.

6. The method of claim 1, wherein sending iterations of a first training pattern comprises disabling a main band clock line transmitter of other than the first main band clock line.

7. The method of claim 1, wherein sending iterations of the first training pattern comprises sending 128 iterations thereof and wherein the receiving the training result comprises receiving the training result before all of the 128 iterations of the first training pattern and after 16 iterations of the first training pattern.

8. The method of claim 1, further comprising:
    sending an enable request from the module through the sideband to enable automatic result sharing for training main band clock lines, the automatic result sharing including the receiving a training result from the module partner through the sideband prior to completion of the iterations of the first training pattern and before sending a request for a training report to the module partner; and
    receiving an enable response from the module partner through the sideband to enable automatic result sharing.

9. The method of claim 8, wherein sending iterations of the first training pattern is in response to the receiving the enable response.

10. The method of claim 8, wherein the sending the enable request comprises sending the enable request during a main band initialization.

11. The method of claim 8, further comprising storing in a link configuration register an enable bit indicating that automatic result sharing is enabled for training main band clock lines.

12. The method of claim 8, further comprising:
    sending a support request to the module partner through the sideband to support the automatic result sharing; and
    receiving a support response from the module partner to support the automatic result sharing,
    wherein the sending the enable request is in response to receiving the support response.

13. The method of claim 10, wherein the sending the support request comprises sending an automatic result sharing support parameter, the method further comprising storing the automatic result sharing support parameter in a configuration register in response to receiving the support response.

14. The method of claim 13, wherein the automatic result sharing parameter identifies a clock line of the main band through which the iterations of the first training pattern are sent.

15. The method of claim 13, wherein the sending the enable request comprises sending the enable request in response to an automatic result sharing support parameter being present in a configuration register.

16. A non-transitory computer-readable medium having instructions stored therein for causing a processor of a die to perform operations comprising:
    sending iterations of a first training pattern from a module of a first die to a module partner of a second die on a first main band clock line of a die-to-die connection that connects the module to the module partner, the die-to-die connection including a sideband, a main band comprising the first main band clock line, and at least one data line supported by at least the first main band clock line;
    receiving a training result from the module partner through the sideband prior to completion of the iterations of the first training pattern, the training result indicating successfully detecting the training pattern on the first main band clock line prior to completion of the iterations of the first training pattern;
    ceasing sending iterations of the first training pattern in response to the receiving the training result; and
    communicating data with the module partner through the main band using at least the first main band clock line in response to receiving the training result.

17. The computer-readable medium of claim 16, wherein the operations for receiving the training result comprise receiving the training result before sending a request for a training report to the module partner.

18. The computer-readable medium of claim 16, the operations further comprising sending iterations of a second training pattern from the module to the module partner on a second main band clock line prior to completion of the iterations of the first training pattern and in response to the receiving the training result.

19. The computer-readable medium of claim 16, the operations further comprising:
sending an enable request from the module through the sideband to enable automatic result sharing for training main band clock lines, the automatic result sharing including the receiving a training result from the module partner through the sideband prior to completion of the iterations of the first training pattern and before sending a request for a training report to the module partner; and
receiving an enable response from the module partner through the sideband to enable automatic result sharing.

20. An apparatus comprising:
a main band transmitter of a module of a first die configured to send iterations of a first training pattern from a module of a first die to a module partner of a second die on a first main band clock of a die-to-die connection that connects the module to the module partner, the die-to-die connection including a sideband, a main band comprising the first main band clock line, and at least one data line supported by at least the first main band clock line; and
a sideband receiver of the module configured to receive a training result from the module partner through the sideband prior to completion of the iterations of the first training pattern, the training result indicating successfully detecting the training pattern,
the main band transmitter further configured to cease sending iterations of the first training pattern in response to the receiving the training result and to communicate data with the module partner through the main band using at least the first main band clock line in response to receiving the training result.

21. The apparatus of claim 20, wherein the iterations of the first training pattern comprise 128 iterations thereof and wherein the sideband receiver is configured to receive the training result before all of the 128 iterations of the first training pattern and after 16 iterations of the first training pattern.

22. The apparatus of claim 20, further comprising a link configuration register, and a processor configured to store an enable bit in the configuration register indicating that automatic result sharing is enabled for training main band clock lines.

23. The apparatus of claim 22, wherein the automatic result sharing parameter identifies a clock line of the main band through which the iterations of the first training pattern are sent.

* * * * *